UNITED STATES PATENT OFFICE.

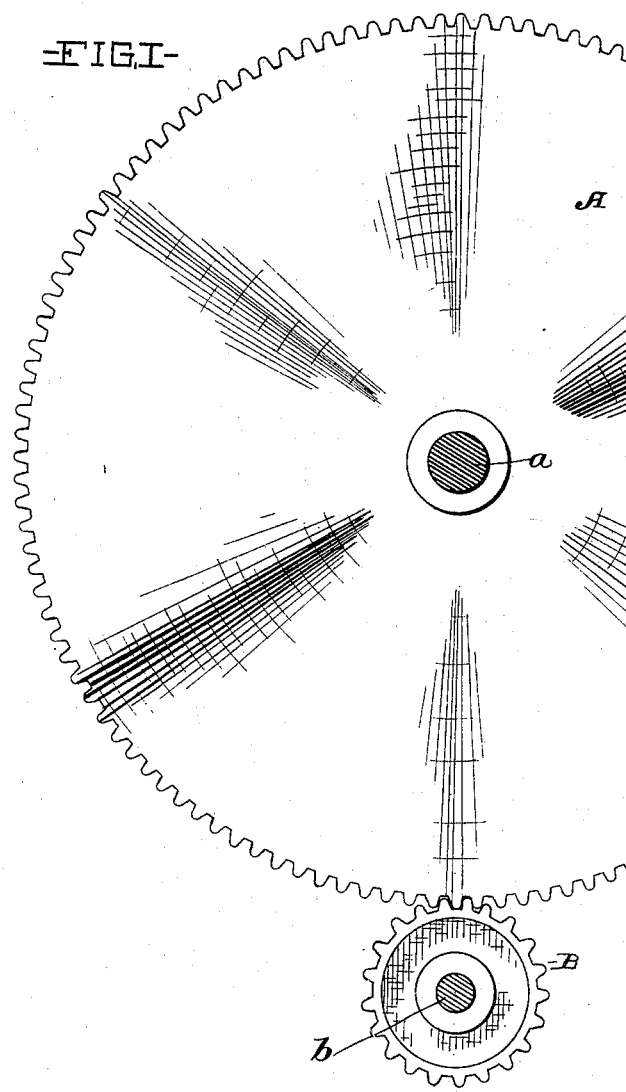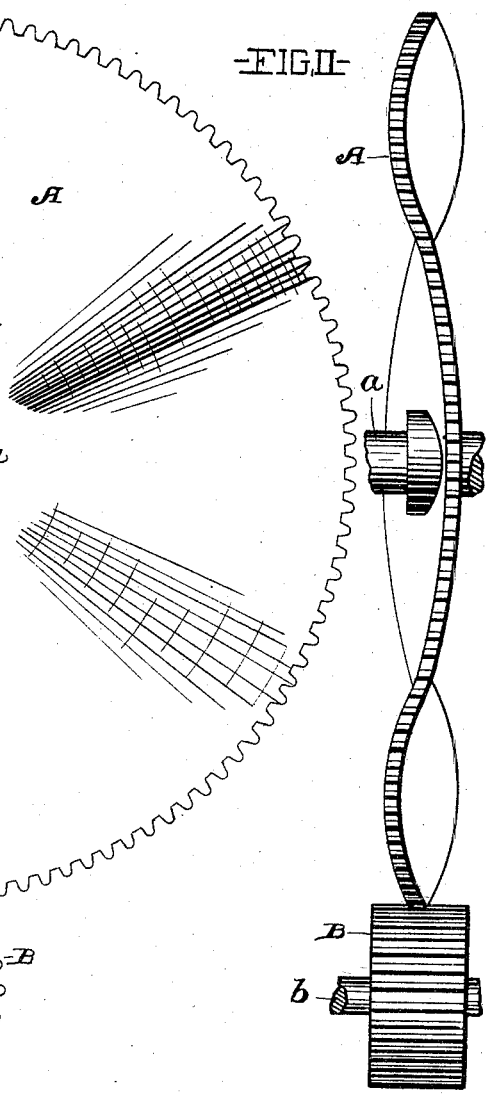

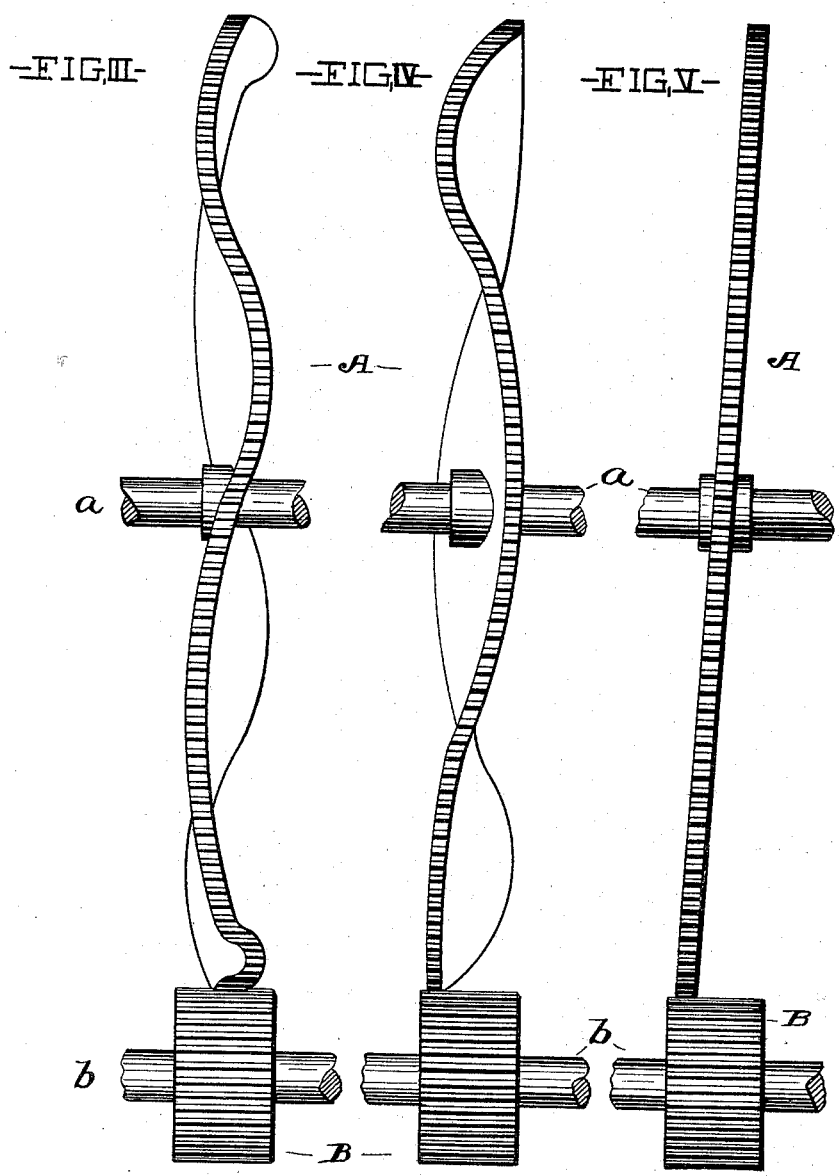

JOSEPH A. WILLIAMS, OF CLEVELAND, OHIO, ASSIGNOR TO THE WILLIAMS ELECTRIC COMPANY, OF SAME PLACE.

GEAR-WHEEL.

SPECIFICATION forming part of Letters Patent No. 610,215, dated September 6, 1898.

Application filed April 12, 1898. Serial No. 677,284. (Model.)

*To all whom it may concern:*

Be it known that I, JOSEPH A. WILLIAMS, of Cleveland, county of Cuyahoga, and State of Ohio, have invented certain new and useful Improvements in Gear-Wheels; and I do hereby declare the following to be a full, clear, and exact description of the invention, such as will enable others skilled in the art to which it pertains to make and use the same.

My invention relates to improvements in gear-wheels, and more especially to a comparatively thin anomalous gear-wheel designed to coöperate or mesh with a pinion or diametrically smaller gear without causing contact with the teeth of the smaller gear in the same place during all of the rotations made by the pinion during a complete rotation of the larger gear.

My improved gear is more especially designed for light work—such, for instance, as is required of certain gearing employed in telephonic instruments, electrical instruments, and clockwork—and the primary object of my invention is to prolong the life of the pinion or diametrically smaller gear with which my improved gear coöperates.

In the accompanying drawings, Figure I is an elevation of the gear, taken at right angles to the gear's axis and shows the gear having one hundred and twenty teeth and in mesh with a pinion having twenty-one teeth. Fig. II is a side elevation of the same. Figs. III, IV, and V are side elevations of a gear meshing with a pinion and embodied in my invention.

The drawings show the subject exaggerated in size.

Referring to the drawings, A designates my improved gear; *a*, the gear-bearing shaft; B, the pinion in mesh with the said gear, and *b* the shaft that bears the pinion.

The gear shown in Figs. I and II has one hundred and twenty teeth and the pinion shown in the said figures has twenty-one teeth.

The essential feature of my invention consists in a gear-wheel having a rim or face that not only extends annularly and concentrically of the wheel's axis but has a trend axially of the wheel and also out of line with or diagonally of a plane arranged at right angles to an axial plane of the wheel, so that the wheel during a complete rotation shall not strike or engage the pinion in the same place as many times as would be the case if it were constructed with an annular rim or face in one plane at right angles to the axial plane in the usual manner.

I would here remark that hereinafter in this specification I use the word "pinion" in referring to the diametrically smaller gear and employ the word "gear" in referring to my improved wheel.

It is obvious that a gear having its rim or face arranged in a plane at right angles to the wheel's axial plane will engage each tooth of the engaging pinion, especially if the latter is comparatively small in diameter, several times in exactly the same place during a complete rotation of the larger gear and result in the wearing of an annular groove in the face of the pinion, especially if the gear is made of sheet metal, and render the pinion unfit for further use. For instance, a gear made in the usual manner with its rim or face arranged in a plane at right angles to its axial plane and having one hundred and twenty teeth would engage the same point of each tooth of a pinion having twenty teeth six times during a complete rotation of the gear. It will be observed, therefore, that if the concentrically-arranged rim or face of the gear is arranged also in a path diagonally of a plane at right angles to its axial plane, as shown in the several figures of the drawings, the number of times that each tooth of the engaging pinion is engaged by the gear during a complete rotation of the latter will be materially reduced. Of course the pinion's rim or face would have to be wide enough to accommodate the maintenance of engagement or mesh between the two wheels during the complete rotation of the gear, and consequently should extend axially in opposite directions as far as the rim or face of the gear extends axially in opposite directions.

The preferred form of the gear is shown in Figs. I and II, wherein the trend of the rim or face is a symmetrical compound curve extending several times diagonally of a plane at right angles to the gear's axial plane and extending in opposite directions alternately, and if the gear has several times as many teeth as the pinion and the quotient obtained by dividing the number of the gear's teeth by the number of the pinion's teeth is a mixed number—as, for instance, in Fig. I, wherein the number of the pinion's teeth is one in excess of the number required to equally divide the number of the gear's teeth—any tooth of the pinion will be engaged in the same place only once in many successive rotations of the pinion.

The forms of gears shown in Figs. III, IV, and V are also within the scope of my invention. In Fig. III the rim or face of the gear has a trend forming alternately long and short curves reversely arranged. In Fig. IV the said trend forms curves whereof contiguous curves have their meeting ends located a distance apart axially of the gear from any other curve meeting ends. In Fig. V the said trend does not form curves, but is confined in one plane oblique to the gear's axial line.

In all of the specific forms illustrated the teeth of the gear are parallel to the wheel's axis, and I would remark that the gear is composed, preferably, of a single metallic plate or sheet stamped into the shape required to form the peculiar trend of the rim or face of the gear, and the teeth are cut after the rim's trend is formed.

It will be observed also that in all of the forms illustrated the engaging gear and pinion are fixed so far as axial movement upon their supporting-shaft is concerned and that the pinion, as already indicated, has its face extending axially far enough to maintain mesh between the two wheels during a complete rotation of the gear.

What I claim is—

1. A gear provided with a toothed rim or face having a trend forming a series of successive curves extending axially of the wheel and diagonally of a plane at right angles to the wheel's axis, substantially as set forth.

2. A sheet-metal gear having its rim or face arranged concentrically of the gear's axis and having a sinuous trend axially, substantially as set forth.

3. A gear having its rim or face arranged concentrically of the gear's axis and having a sinuous trend forming curves reversely arranged alternately, substantially as set forth.

4. The combination with a gear having its rim or face arranged concentrically of the gear's axis and having a trend extending axially; of a pinion meshing with the gear and fixed so far as axial movement is concerned and having its face extending axially far enough to maintain mesh between the two wheels during a complete rotation of the gear, substantially as set forth.

5. The combination with a gear, provided with a rim or face having a trend axially as well as circumferentially; of a pinion meshing with the gear and having its face extending axially far enough to maintain mesh between the two wheels during a complete rotation of the gear, which pinion is fixed so far as axial movement independently of the gear is concerned and has such a number of teeth relative to the number of the gear's teeth that the quotient obtained by dividing the number of the gear's teeth by the number of the pinion's teeth is a mixed number, substantially as and for the purpose set forth.

6. The combination with the gear provided with a rim or face having a trend axially as well as circumferentially; of a pinion meshing with the gear and fixed so far as axial movement of the same independently of the gear is concerned and having its face extending axially far enough to maintain mesh between the two wheels during a complete rotation of the gear and having a tooth in excess of a number that will equally divide the number of the gear's teeth, substantially as set forth.

Signed by me, at Cleveland, Ohio, this 5th day of April, 1898.

JOSEPH A. WILLIAMS.

Witnesses:
C. H. DORER,
ANNA PARRATT.